United States Patent [19]

Mizukusa et al.

[11] Patent Number: 4,759,644
[45] Date of Patent: Jul. 26, 1988

[54] GAS BEARING BODY

[75] Inventors: Hisayosi Mizukusa; Sigenori Murate, both of Nagoya, Japan

[73] Assignee: NGK Spark Plug Co., Ltd., Nagoya, Japan

[21] Appl. No.: 100,102

[22] Filed: Sep. 23, 1987

[30] Foreign Application Priority Data

Sep. 30, 1986 [JP] Japan .............................. 61-148718[U]

[51] Int. Cl.⁴ .............................................. F16C 32/06
[52] U.S. Cl. ..................... 384/118; 384/114; 384/282; 384/907.1; 384/913
[58] Field of Search ............ 384/118, 114, 913, 907.1, 384/282, 115, 107

[56] References Cited

U.S. PATENT DOCUMENTS

| | | | |
|---|---|---|---|
| 3,129,037 | 4/1964 | Ott ....................................... | 384/118 |
| 3,385,641 | 5/1968 | Foglia ................................. | 384/118 |
| 3,726,572 | 4/1973 | Beardmore ......................... | 384/913 |
| 4,169,637 | 10/1979 | Voitas ................................. | 384/913 |

Primary Examiner—Lenard A. Footland
Attorney, Agent, or Firm—Foley & Lardner, Schwartz, Jeffery, Schwaab, Mack, Blumenthal & Evans

[57] ABSTRACT

The invention relates to a journal gas bearing body which is formed with a cylindrical bore to rotatably support therein the journal part of a shaft and gas introducing holes radially opening into the cylindrical bore. The bearing body is made of a metal, and only in opposite endmost sections of the cylindrical bore the cylindrical inner surface defining the bore is provided by a very hard and wear resistant material, which is either a ceramic or a cemented carbide. It is convenient to provide the hard inner surface in each of said endmost sections by insertion of a hollow cylindrical bushing formed of a ceramic or a cemented carbide. The gas introducing holes are all located lengthwise inward of said endmost sections to avoid boring through the ceramic or cemented carbide layer. Accordingly the bearing body can easily be manufactured without significant increase in the working cost.

4 Claims, 1 Drawing Sheet

GAS BEARING BODY

BACKGROUND OF THE INVENTION

This invention relates to jouunal gas bearings, and more particularly to a journal gas bearing body which is formed with a cylindrical bore to rotatably support therein a journal part of a shaft and gas introducing holes radially opening into the cylindrical bore.

In journal gas bearings which are employed, for example, in automotive turbochargers and also in instruments for measuring dynamic balance of turbochargers or the like, the journal part of a rotating shaft is floated on an annular film of a compressed gas which is introduced into the bearing through radial holes bored in the bearing body. Usually, opposite end sections of the cylindrical bore in the bearing body are used as true bearing sections. That is, in the respective end sections the clearance between the shaft and the cylindrical inner surface of the bearing body is strictly determined and in these sections the gas introducing holes open in the cylindrical inner surface.

However, in the bearing sections the rotating shaft comes into direct contact with the inner surface of the bearing body at starting and stopping operation and also when a large amount of unbalance arises in the rotation of the shaft. Therefore, it is necessary to afford wear resistance to the cylindrical inner surface of the bearing body in its bearing sections by making a hardening treatment such as a nitriding treatment or by using a ceramic or a cemented carbide in the bearing sections. However, when such a measure is taken and especially when a ceramic or cemented carbide is used difficulties are encountered in boring the gas introducing holes and in polishing the cylindrical inner surface in the bearing sections, so that great increase in the manufacturing cost of the bearing body is inevitable.

SUMMARY OF THE INVENTION

It is an object of the present invention to provide an improved journal gas bearing body which is very high in wear resistance of the inner surface in the bearing sections and can easily be manufactured without significant increase of working cost.

According to the invention, there is provided a gas bearing body which is made of a metal and is formed with a cylindrical bore to allow a shaft to rotatably extend therethrough and gas introducing holes radially opening into the cylindrical bore, the bearing body being characterized in that only in opposite endmost sections of said cylindrical bore the cylindrical inner surface defining said bore is provided by a different material which is higher in hardness than said metal and comprises a nonmetallic substance and that the gas introducing holes are all located in sections lengthwise inward of said endmost sections so as to open in the cylindrical inner surface provided by said metal.

The hard material used to provide the cylindrical inner surface in the both end sections, viz. bearing sections, of the cylindrical bore is either a ceramic or a cemented carbide. In preferred embodiments of the invention, the hard inner surface of the bearing body in each of its bearing sections is provided by inserting a hollow cylindrical bushing formed of a ceramic or a cemented carbide into each endmost section of the bored bearing body.

In a gas bearing body according to the invention the cylindrical inner surface in each bearing section is very high in wear resistance because of using a ceramic or a cemented carbide. In this bearing body there is no problem in forming the gas introducing radial holes since the holes are bored in entirely metal sections. Therefore, the use of the very hard material to provide wear resistant bearing surfaces does not lead to a significant increase in the working cost. Moreover, in case of wear of the bearing surfaces by long and repeated operation it is possible to repair the bearing by mere replacement of the ceramic or cemented carbide bushings instead of replacing the bearing body as a whole. When this matter is taken into consideration, the advantage of the invention in the cost aspect further augments.

DESCRIPTION OF THE PREFERRED EMBODIMENTS

Figure 1:
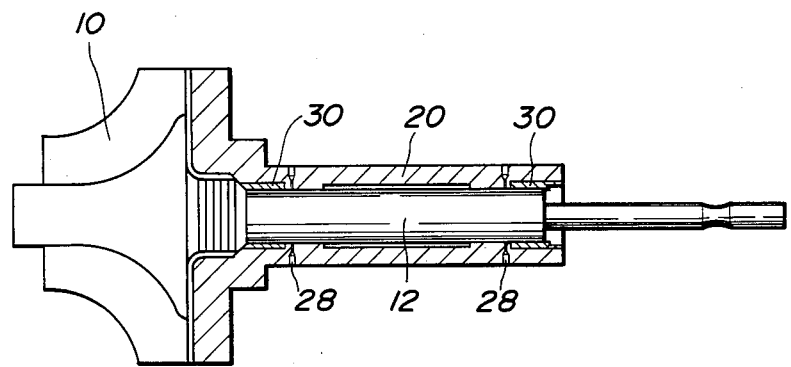
FIG. 1 is a longitudinal sectional view of a gas bearing part of a gas turbine device.
Figure 2:
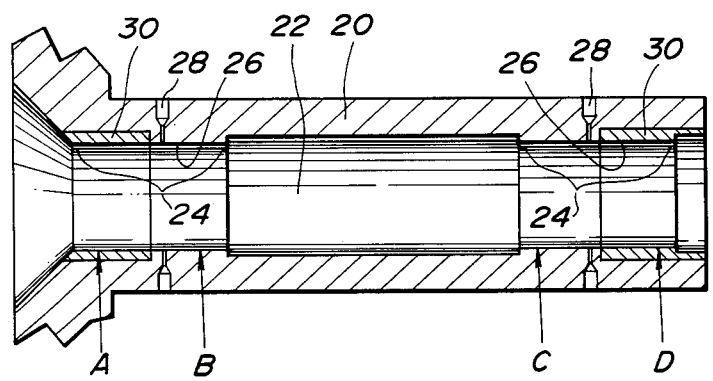
FIG. 2 is a longitudinal sectional view of a bearing body according to the invention used in the gas bearing part of FIG. 1.

FIG. 1 shows an application of the present invention to a gas turbine device such as an automotive turbocharger. Numeral 10 indicates a turbine wheel which is fixedly mounted on a cylindrical shaft 12. The shaft 12 is rotatably supported in a gas bearing body 20 the details of which are shown in FIG. 2. That is, the bearing body 20 is formed with cylindrical bore 22 to allow the shaft 12 to extend therethrough. In its middle section the cylindrical bore has a diameter apparently larger than the diameter of the shaft 12. In its opposite end sections 24 to serve as true bearing sections, the a cylindrical bore 22 has a precisely determined diameter which is slightly greater than the diameter of the shaft 12 so that a predetermined clearance may exist between the cylindrical inner surface 26 of the body 20 and the shaft 12 when the shaft 12 is exactly coaxial with the bore 22. The bearing body 20 is formed with a plurality of radial holes 28 through which a compressed gas is introduced into the annular gap between the cylindrical inner surface 26 and the shaft 12 during operation of the gas turbine. The gas is exhausted in the direction axially of the bore 22 along the rotating shaft 12.

The bearing body 20 is made of a metal which serves as a structural material and can be machined without great difficulty. However, according to the invention a very hard and wear resistant inner surface is provided to the bearing body 20 only in an endmost part of each bearing section 24. This is accomplished by suitably enlarging the diameter of the bore 22 in its endmost sections and tightly inserting a hollow cylindrical bushing 30 formed of a ceramic or a cemented carbide into each of the interiorly enlarged sections of the bearing body 20. It is important that the gas introducing holes 28 be all located lengthwise inward of the inserted bushings 30. That is, every gas introducing hole 28 is bored in an entirely metal section of the bearing body 20 and opens in the cylindrical inner surface 26 of the metal body.

A very good example of the ceramic as the material of the hard bushings 30 is $Si_3N_4$, though it is also possible to use a different ceramic such as SiC, $ZrO_2$ or $Al_2O_3$. A very good example of the cemented carbide as the material of the bushings 30 is a WC-TiC-TaC-Co system, though it is also possible to use a different system such as WC-TiC-Co or WC-Co.

EXPERIMENT

Two kinds of samples, Sample (1) and Sample (2), of the bearing body 20 shown in FIG. 2 were produced by using Si$_3$N$_4$ceramic and WC-TiC-TaC-CO cemented carbide (ISO K-01), respectively, as the material of the inserted bushings 30. The basic material of the bearing body 20 was an aluminum-chromium-molybdenum steel (SACM 645). For comparison, Sample (3) of the bearing body 20 was produced without using the hard bushings 30. That is, in Sample (3) the whole areas of the cylindrical inner surface 26 were provided by the steel (SACM 645). Besides, two samples not in accordance with the invention were produced by using the same steel as the basic material of the bearing body 20. In Sample (4) the whole area of the cylindrical inner surface in each bearing section 24 was provided by Si$_3$N$_4$, so that the gas introducing holes 30 were bored through the ceramic layer. In Sample (5) the whole area of the cylindrical inner surface 26 in each bearing section 24 was provided by the aforementioned WC-TiC-TaC-Co cemented carbide, so that the holes 28 were bored through the cemented carbide layer.

Each of these sample bearing bodies was used in the gas bearing part of the turbocharger in FIG. 1, and the turbine wheel 10 was cyclically driven 10,000 times. In each cycle of operation the speed was increased from 0 to a maximum of 3000 rpm and then reduced to 0, and the operating time was 1 min. After that amounts of wear of the inner surface of the bearing body were measured at positions A, B, C and D indicated in FIG. 2. The results are shown in the following table.

Besides, manufacturing costs of these sample bearing bodies are shown in the same table by indexes on the basis of 100 for the cost of the reference Sample (3). In producing these samples the ceramic parts were machined with diamond tools, while the cemented carbide parts were worked by an electric discharge machining method.

| Sample | Hard Material | Hardness of Inner Surface in Bearing Section (H$\nu$) | Amount of Wear ($\mu$m) | | | | Cost |
|---|---|---|---|---|---|---|---|
| | | | A | B | C | D | |
| (3) | — | 900 | 50 | 15 | 5 | 20 | 100 |
| (4) | ceramic | 1400 | <1 | <1 | <1 | <1 | 400 |
| (5) | cemented carbiode | 1500 | <1 | <1 | <1 | <1 | 300 |
| (1) | ceramic | 1400 | <1 | <1 | <1 | <1 | 110 |
| (2) | cemented carbide | 1500 | <1 | <1 | <1 | <1 | 110 |

As is evident from the test results in the above table, the bearing bodies according to the invention are sufficiently high in wear resistance of the cylindrical inner surface in the bearing sections: wear of less than 1 $\mu$m is within the limits of accuracy of measurement. Furthermore, this invention brings about a remarkable reduction in the manufacturing cost compared with the known techniques to provide a wear resistant inner surface by using a ceramic or a cemented carbide.

What is claimed is:

1. A gas bearing body which is made of a metal and is formed with a cylindrical bore to allow a shaft to rotatably extend therethrough and gas introducing holes radially opening into the cylindrical bore,
    characterized in that only in opposite endmost sections of said cylindrical bore the cylindrical inner surface defining said bore is provided by a different material which is higher in hardness than said metal and comprises a nonmetallic substance and that said gas introducing holes are all located in sections lengthwise inward of said endmost sections so as to open in the cylindrical inner surface provided by said metal.

2. A gas bearing body according to claim 1, wherein said different material is a ceramic.

3. A gas bearing body according to claim 1, wherein said different material is a cemented carbide.

4. A gas bearing body according to claim 1, wherein each of said endmost sections of said cylindrical bore is defined by a cylindrical inner surface of a hollow cylindrical bushing formed of said different material and inserted in the bearing body.

* * * * *